Patented Apr. 4, 1944

2,346,059

UNITED STATES PATENT OFFICE 2,346,059

CARBALKOXYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application July 28, 1939,
Serial No. 287,001

16 Claims. (Cl. 260—475)

This invention relates to carbalkoxylation of organic compounds, and with respect to certain more specific features, to the introduction of carbalkoxy groups into a wide variety of organic compounds.

Among the several objects of the invention may be noted the provision of a general process for bringing about a carbalkoxylation of the type indicated which is characterized in its high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

It is difficult to define with accuracy the broad class of materials to which the process of the present invention applies. In general, it appears that the process can be satisfactorily used in all instances where carbalkoxylation of the type indicated is wanted. Most of such instances seem to comprehend the replacement of an active carbon-bonded hydrogen on the organic compound with the carbalkoxylic group, and the invention will be so described, although it is not intended thereby to so limit the scope of the invention.

The process of the present invention, in addition to providing for the introduction of a carbalkoxy group, usually provides for the introduction of a metallo-group onto the carbalkoxylated compound. The metal of such a group is usually, and preferably, one of the alkali or alkaline earth group metals, or aluminum. The product at this stage of the reaction is a highly reactive metallo compound, which can quickly and easily be converted into any number of types of compounds. For example, the metallo group, if it be sodium, may be readily replaced by either hydrogen or by an alkyl group by procedures of a known type.

Broadly speaking, the process of the present invention comprises condensing the compound to be carbalkoxylated with a metal alcoholate, preferably alcohol-free, in a reaction medium comprising a large excess of a dialkyl carbonate.

This may be represented by the following equation:

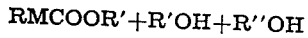

$RH_2 + R'_2CO_3 + MOR'' \rightarrow$
$\qquad RMCOOR' + R'OH + R''OH$ where R is the residue of the compound to be carbalkoxylated, R' is the alkyl of the dialkyl carbonate, M is an alkali metal, and R'' is the radical of the alcoholate.

$R \cdot CH_2 \cdot R''' + R'_2CO_3 + MOR'' \rightarrow$
$\qquad R \cdot C(M)(COOR') \cdot R''' + R'OH + R''OH$ where R is selected from hydrogen and organic residues which do not possess an aliphatic multiply-bonded carbon atom adjacent to the CH$_2$ group, R''' is an organic residue attached to the CH$_2$ group by a carbon atom which is multiply-bonded to an atom other than carbon, R' is the alkyl of the dialkyl carbonate, M is an alkali or alkaline earth metal or aluminum, and R'' is the radical of the alcoholate.

The mechanism of the reaction involved in the process of the present invention has not yet been definitely established. The substantial excess of dialkyl carbonate appears to be an important factor.

The reaction may be pushed to substantial completion by heating, as it progresses, to distill off the product alcohols (R'OH and R''OH in the above equation). In case the original metal alcoholate contains alcohol, such alcohol is likewise removed by this distillation procedure. This procedure, while somewhat optional, is highly advantageous in its improvement in the yield of carbalkoxylated compound obtained.

The process of the present invention finds particular utility, for example, in the preparation of sodio-phenylmalonic esters, such as the ethyl ester, $C_6H_5CNa(COOC_2H_5)_2$ which is an intermediate for the preparation of phenylethylmalonic esters, which are in turn convertible into phenobarbital (phenylethyl barbituric acid). For this particular application of the invention, a phenylacetic ester is reacted with alcohol-free sodium methylate and ethyl carbonate according to the equation:

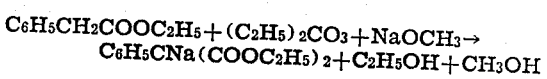

$C_6H_5CH_2COOC_2H_5 + (C_2H_5)_2CO_3 + NaOCH_3 \rightarrow$
$\qquad C_6H_5CNa(COOC_2H_5)_2 + C_2H_5OH + CH_3OH$ Details of this process, by way of example of the invention, are appended.

450 ml. of diethyl carbonate is placed in a one liter, three-necked flask fitted with a mercury sealed mechanical stirrer. 43 grams of solid alcohol-free sodium methylate is added, and then 123 grams of pure ethyl ester of phenylacetic acid is introduced. The mixture becomes yellow and there is a little reaction heat evolved. By warming gently, all of the sodium methylate is brought into solution. The flask is then attached to a fractionating column arranged for reduced pressure distillation, and placed in an oil bath. The oil bath is then heated so that a mixture of alcohol and diethyl carbonate is fractionated off. After about two hours heating at 175 mm. pressure, the temperature at the head of the fractionating column is about 72° C., and at the bottom of the column is about 78° C. The residue in the flask then consists principally of the desired sodio compound, with an excess of diethyl carbonate.

Since the intended use for this sodio compound is the preparation therefrom of phenylethylmalonic ester, the said sodio compound need not be recovered from the residue as such, but the residue may be worked up in the following manner:

After cooling, 100 grams of ethyl bromide is added to the entire lot of residue, and the mixture is heated slowly to 90° C. and maintained at that temperature for about four hours. During this period a solid (sodium bromide) separates from the solution. After cooling, an excess of acetic acid is added and the product poured onto about 300 grams of ice. The water layer is then separated and extracted with a little ether, which is combined with the organic layer. The latter is washed with water and dried over calcium chloride and then distilled from a Claissen flask, yielding 300 grams of diethyl carbonate. The oily residue is then distilled under reduced pressure, the distillate commencing to come over at 130° C. at 30 mm. pressure. At the end of the distillation, the temperature is about 142° C. at 4 mm. pressure. A total of about 166.6 grams of phenylethylmalonic ester is to be obtained. Assuming this product to be pure phenylethylmalonic ester, the yield (from the original phenylacetic ester) is about 84% of the theoretical. The identity and purity of the product phenylethylmalonic ester is established by condensing a sample of it with urea, giving a high yield of phenobarbital melting at 175–176° C. The yield of phenobarbital is as good as is usually obtained from pure phenylethylmalonic ethyl ester made by other methods.

Carrying out the above carbalkoxylation without the simultaneous removal, by distillation, of the alcohols produced in the reaction, is entirely feasible, but the yield is somewhat decreased.

Attention is directed to our copending applications, Serial No. 374,254, filed January 13, 1941; Serial No. 375,614, filed January 23, 1941, now Patent 2,342,385; Serial No. 379,828, filed February 20, 1941; Serial No. 387,264, filed April 7, 1941; and Serial No. 452,916, filed July 30, 1942.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:
1. The process for the carbalkoxylation of phenylacetic esters which comprises reacting a phenylacetic ester with a substantially alcohol-free alkali metal alcoholate and a dialkyl carbonate.

2. The process for the carbalkoxylation of phenylacetic esters which comprises reacting a phenylacetic ester with a substantially alcohol-free alkali metal alcoholate and a dialkyl carbonate, said dialkyl carbonate comprising substantially the reaction medium and being present in substantial excess.

3. The process for the carbalkoxylation of phenylacetic esters which comprises reacting a phenylacetic ester with a substantially alcohol-free alkali metal alcoholate and a dialkyl carbonate, said dialkyl carbonate comprising substantially the reaction medium, and continuously removing alcohol from the reaction mixture.

4. The process for the carbalkoxylation of phenylacetic esters which comprises reacting a phenylacetic ester with an alkali metal alcoholate and a dialkyl carbonate.

5. The process for the carbalkoxylation of phenylacetic esters which comprises reacting a phenylacetic ester with an alkali metal alcoholate and a dialkyl carbonate, said dialkyl carbonate comprising substantially the reaction medium and being present in substantial excess.

6. The process for the carbalkoxylation of phenylacetic esters which comprises reacting a phenylacetic ester with an alkali metal alcoholate and a dialkyl carbonate, said dialkyl carbonate comprising substantially the reaction medium, and continuously removing alcohol from the reaction mixture.

7. The process of making sodio-phenylmalonic esters which comprises reacting a phenylacetic ester with a sodium alcoholate and a dialkyl carbonate.

8. The process of making sodio-phenylmalonic esters which comprises reacting a phenylacetic ester with a sodium alcoholate and a dialkyl carbonate, said dialkyl carbonate comprising substantially the reaction medium and being present in substantial excess.

9. The process of making sodio-phenylmalonic esters which comprises reacting a phenylacetic ester with a sodium alcoholate and a dialkyl carbonate, said dialkyl carbonate comprising substantially the reaction medium, and continuously removing alcohols from the reaction mixture.

10. The process as set forth in claim 7, in which the alcoholate is substantially alcohol-free sodium methylate.

11. The process as set forth in claim 8, in which the alcoholate is substantially alcohol-free sodium methylate.

12. The process as set forth in claim 9, in which the alcoholate is substantially alcohol-free sodium methylate.

13. The process as set forth in claim 7, in which the dialkyl carbonate is diethyl carbonate.

14. The process as set forth in claim 8, in which the dialkyl carbonate is diethyl carbonate.

15. The process as set forth in claim 9, in which the dialkyl carbonate is diethyl carbonate.

16. The process as set forth in claim 7, in which the alcoholate is substantially alcohol-free sodium methylate, and the dialkyl carbonate is diethyl carbonate.

VERNON H. WALLINGFORD.
AUGUST H. HOMEYER.